No. 856,514. PATENTED JUNE 11, 1907.
J. W. CULMER.
CHEESE CUTTER.
APPLICATION FILED MAR. 15, 1907.

3 SHEETS—SHEET 1.

WITNESSES:
J. F. McGregor
C. B. Hurlbut.

INVENTOR.
John W. Culmer

THE NORRIS PETERS CO., WASHINGTON, D. C.

No. 856,514. PATENTED JUNE 11, 1907.
J. W. CULMER.
CHEESE CUTTER.
APPLICATION FILED MAR. 15, 1907.
3 SHEETS—SHEET 2.
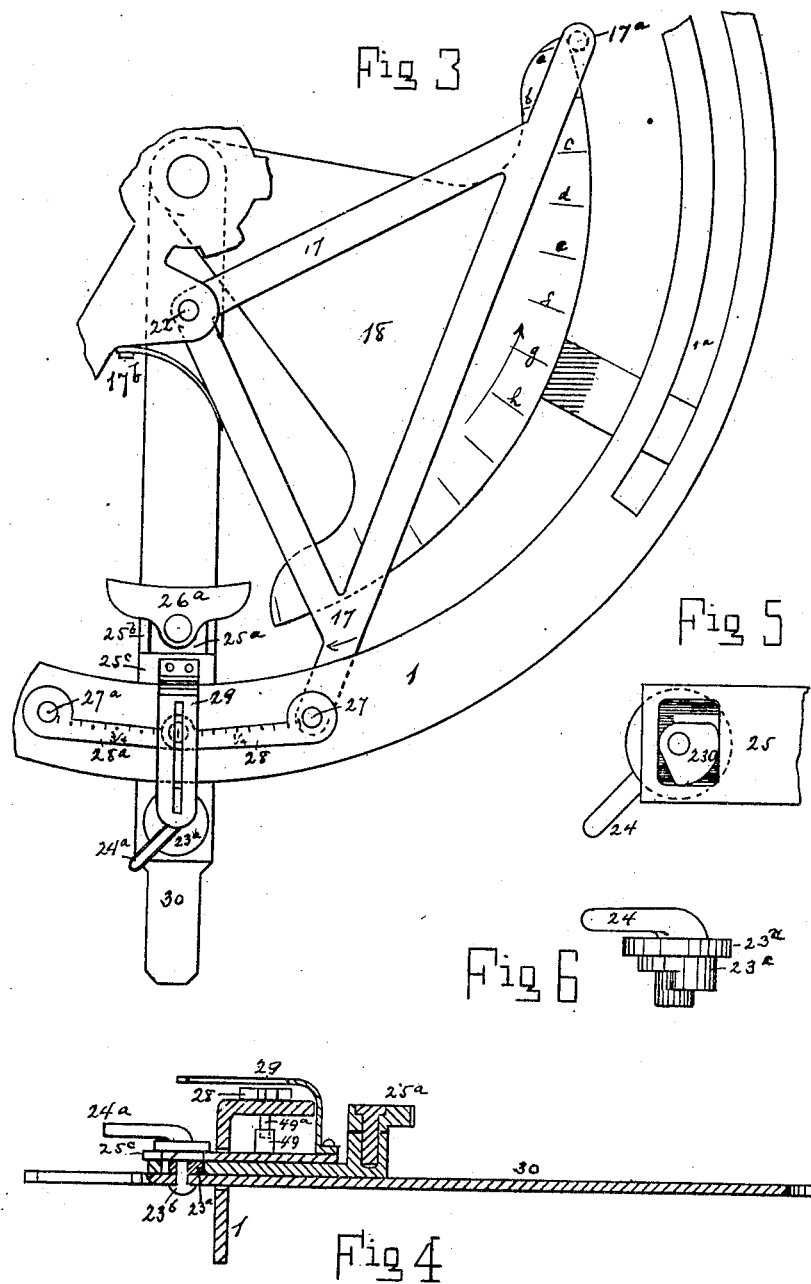
WITNESSES:
INVENTOR.

No. 856,514. PATENTED JUNE 11, 1907.
J. W. CULMER.
CHEESE CUTTER.
APPLICATION FILED MAR. 15, 1907.
3 SHEETS—SHEET 3.
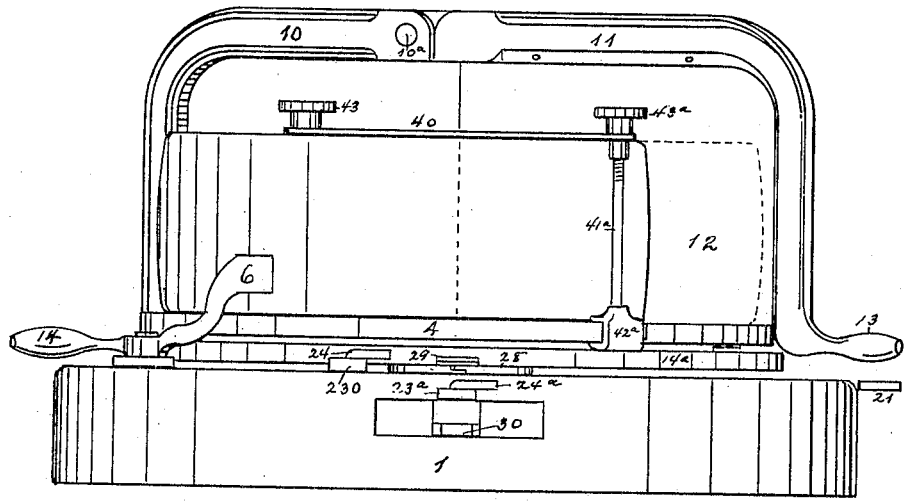
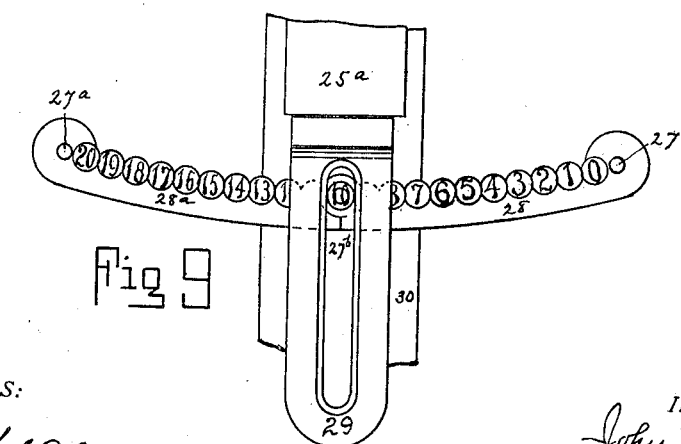
WITNESSES:
INVENTOR.

UNITED STATES PATENT OFFICE.

JOHN W. CULMER, OF CLEVELAND, OHIO, ASSIGNOR TO WILLIAM T. ADAMS, OF CORINTH, MISSISSIPPI.

CHEESE-CUTTER.

No. 856,514.  Specification of Letters Patent.  Patented June 11, 1907.

Application filed March 15, 1907. Serial No. 362,453.

*To all whom it may concern:*

Be it known that I, JOHN W. CULMER, a citizen of the United States, residing at Cleveland, in the county of Cuyahoga and State of Ohio, have invented a new and useful Cheese-Cutter, of which the following is a specification.

My invention relates to a cheese cutter and particularly to that type in which a cheese of a known weight is divided and cut into pounds and multiples or submultiples of a pound; or a cheese irrespective of its weight, which it is desired shall sell for a certain amount in money may be divided into fixed portions of say ten cents or a fraction thereof, or a multiple thereof; and the improvements I have made therein consist; in an adjustable stop mechanism upon the base of the machine, adapted to limit the travel of the revoluble stage which bears the cheese to any desired fraction of the complete revolution of said stage: in the combination, with said stop mechanism and a graduated scale upon the base of an arc, having an outer edge of parabolic curve rotatable about the common center of the machine and provided with an arm extending over the aforesaid graduated arc on the base, and adapted to indicate thereon, in a lever pivoted upon the base and having its one end connected with the adjustable stop device thereon and its other end in elastic contact with the parabolic outer edge of the arc, and movable in fixed relation therewith; in a lever revoluble concentric with the mechanism between the stops of the adjustable stop on the base, and provided with a clutch whereby the revoluble cheese bearing stage may be engaged, moved, and released; in a similar clutch upon the base and adapted to engage with the revoluble stage and lock it in place while the operation of cutting is performed, and to release it for further movement, and in such other devices and combinations as shall hereinafter be shown and described and specifically claimed.

Figure 1:
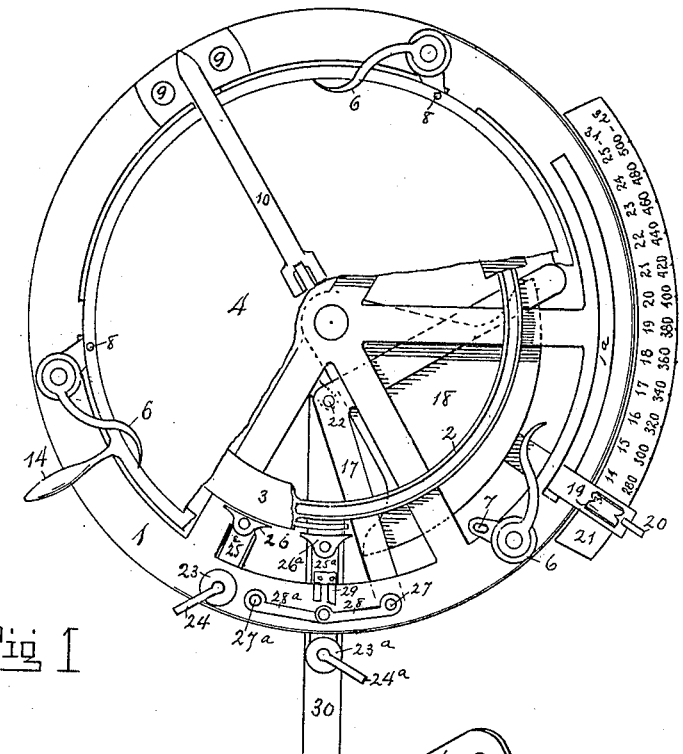
Figure 2:
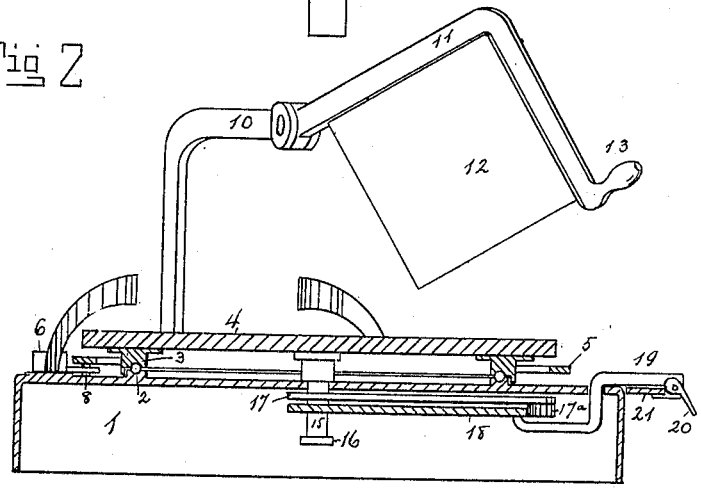

In the accompanying drawings; Figure 1, is a plan view of my improved cheese cutter with a portion of the stage removed. Fig. 2, is a vertical sectional view of the base and stage of the same with the knife raised. Fig. 3, is an enlarged plan view of a portion of the machine showing the relation of the base, lever, adjustable stop and parabolic arc and their connection. Fig. 4, is a sectional view, of Fig. 3, longitudinally of the lever. Fig. 5, is a plan view of the lower side of the clutch slides 25, 25$^a$. Fig. 6, is a projection in elevation of the cams, 23, 23$^a$ of said slides 25, 25$^a$. Fig. 7, is an elevation of a completed machine. Fig. 8, is a view of the clamping device 40. Fig. 9, is an illustration of a form of stop device adapted for use where sales are desired in money values only.

A base, 1, in the drawings, is preferably provided, of a circular form, and provided at one point of its upper surface with a slot 1$^a$, concentric with its center; a concentric ring 2, rises from the upper surface and has its upper surface faced off and grooved to form a race for the reception of balls to support the ring 3, which is similarly grooved, and to which the stage 4 is made fast. The base 1 is bored out centrally to receive the pin 15, to which the stage 4 is made fast, and which projects below the upper shell of the base 1, and forms a center for the lever 30, and the arc 18, to be revolved about. A graduated scale 21, is attached to the outer upper edge of the base 1 concentric with and adapted to register with the concentric slot 1$^a$, in the base 1. An adjustable stop 28, comprises two counterpart halves 28, 28$^a$, which are hinged at their one joined ends and have one free end revolubly attached to the base 1 by the screw 27$^a$ passing through the upper shell of the base, and the other free end, by the screw 27 passing through a curved slot therein and also through the lever 17, at its end, below the upper shell of the base 1; both screws 27, and 27$^a$, extend downwardly below their connecting points, with the base 1, and lever 17, as at 49$^a$ Fig. 4, and form strikes or stops against which the block 49, Fig. 4, impinges at either end of its stroke.

A lever 17, is attached to the base 1, by the pivot 22, Fig. 3, and has one end connected with the slidable end of the stop device 28, by means of the screw 27, and the other end provided with a downwardly projecting stud 17$^a$, resting against the outer edge of the parabolic arc 18, and retained in contact therewith by the spring 17$^b$, upon the base 1.

The arc 18, is fitted upon the central pin 15, below the lever 17, and, at a fixed point upon the lower surface of said arc it is extended down sufficiently to allow the passage of the stud 17ª, thence outwardly and upwardly and upward through the concentric slot 1ª where it extends across the graduated scale 21, and is provided with an opening 19 through which the readings on said scale may be visible, and with a point to indicate the graduations of the scale, and a cam 20, is fitted within the arm outside said scale and adapted to impinge against the outer edge thereof, or within V shaped graduations cut in said graduated scale, and lock the arc 18, at any desired point.

The arc 18, has a peripheral curve of constantly increasing radii from the point $a$ to its opposite point as indicated by the radial marks $a, b, c$, etc. in Fig. 3, and the curve included in said radii is such that, the arc 18, being moved upon the graduated scale 21, causes the lever 17, to rotate about its pivot 22, and closes, or opens, the graduated stop device 28, so that the lever 30, being moved between the stops 49ª of the screws 27, 27ª will cause the stage or table 4, to rotate that fraction of a complete revolution indicated upon 21, by the indicator 19; that is to say, should a cheese weigh fifteen pounds, and the arc be set at 15, on the scale 21, then the stops are so fixed by the action of arc 18, and lever 17, that the handle 30 will move the table 4, one fifteenth of a revolution at one movement between the stops.

The handle lever 30 is fitted upon the central pin 15 below the arc 18 and projects to the exterior of the base 1 through an aperture in one side of said base; toward its projecting end its sides 25ᵇ, are raised to form a seat within which a slide 25, is fitted, and a cover 25ᶜ, made fast upon the sides, incloses said slide 25. At a point outside the base 1, the slide 25, is provided with a rectangular opening in which a cam 230, is inserted, the upper cylindrical portion of said cam being fitted into the cover 25ᶜ, and the lower eccentric portion being fitted within the lever 30, and held in place by the screw 23ᵇ, below the lever, and the disk 23ª, resting upon the cover 25ᶜ; a handle 24ª extends upwardly and outwardly from the cam for the locking and unlocking of the device, and a curved clutch 25ª is mounted upon the inner end of the slide 25 and adapted to clamp the ring 3 on the stage or table 4. A similar case and clutch 23, 24, 25ᵉ and 26 are fitted upon the under side of the base 1, the disk 23, and handle 24, projecting to the upper surface and serve to lock the table 4, when desired, to the base 1.

Upon the top of the base 1, a ring 5, is placed, and at equidistant points on the base are fitted three rotatable arms 6, 6, 6, each having a lug projecting below the ring 4, and slotted radially with the center of the arm 6, to receive a pin 8, projecting downwardly from said ring 4, a handle 14 projects outwardly from the ring 5 and, when moved in one direction the arms are simultaneously rotated toward the center of the table 4, and, in the other direction are moved away from its center.

Upon a convenient point, approximately opposite to the projecting lever 30, a rectangular frame 10, is secured to the base 1 by the bolts 9, 9, its upper portion extending toward the center of the machine; at its inner end it is slotted to receive the end of the knife frame 11, into which the blade 12, is fitted and which is provided with a handle 13, for its operation, a pin 10ª, Fig. 7, forms a joint around which the knife moves, and it is adjusted to have its edges the one horizontal, upon the table 4, and the other vertical, at the exact center of said table, when the blade is down.

The adjustable stop 28, 28ª, has a series of markings upon its inner edge, which may be made to indicate quarters or halves of its entire opening; or cents, upon the basis of the amount in cents fixed as the largest movement of the lever 30 between the stops on the stop 28, 28ª. As illustrated in Fig. 9, it is shown as twenty cents, that being an approved price per pound for cheese; then if a fifteen pound cheese were placed upon the table 4, and the arc 18, set at fifteen pounds upon the scale 21, the lever 30, would move the cheese upon the table to the extent of one pound, or one fifteenth of its total weight, or twenty cents. The plate 29 is made fast upon the lever 30 and moves, with said lever, over the indications upon the stop 28, so that, when desired the operator may stop at 1, 2, 3 or any other cents worth and cut that quantity from the cheese. If it is desired to obtain for a cheese, say, $4.00 irrespective of its weight, the arc 18 is set upon the scale 20 at $4.00 on the outer row of figures 32, instead of being set at a given weight upon the inner row 31, and the space between the stops of the stop device 28 then gives twenty cents worth at each stroke.

Fig. 8 illustrates a clamping device which is shown in place upon the cheese in Fig. 7; two uprights 41, 41ª, have their lower ends recessed 42 42ª, to fit upon the table 4, and their upper ends threaded to receive the thumb nuts 43, 43ª; a bar 40 is placed across the top of the cheese and its ends slip over the screw ends of the uprights 41, 41ª; the bar is bent to one side at its center to clear the knife 12 and when screwed down in place by means of the nuts 43, 43ª holds the cheese firmly in place until it is half cut then the clamp may be moved by loosing the nuts and the cheese again made fast.

I claim

1. In a cheese cutter having a base, a table revoluble upon the base, a knife for cutting the cheese, and an equally spaced scale for indicating the weight or value of the cheese upon the table, a lever having a cam operable clamp adapted to clasp or release the table, and a stop device controlled by said equal spaced scale for limiting the movement of said lever whereby said table may be moved to any fixed point as shown and described.

2. In a cheese cutter, a base, a revoluble table concentric with the base, a lever adapted to move the table upon the base, an equally spaced scale of weight concentric with the table on the base, an adjustable stop device controlling the lever in proportion to said movement, a proportional adjusting device operable in registry with the scale and connected with the adjustable stop, a means for centering a cheese upon the table, and means for locking and unlocking the table to the lever, and of locking and unlocking the table to the base, and a knife for cutting the cheese upon the table, as shown and described.

3. A cheese cutter comprising a base, a table concentric with and revoluble upon the base, an equally spaced scale of weights concentric with the table upon the base, a parabolic arc revoluble about the common center and indicating upon the scale, an adjustable stop device upon the base, a lever within the base connecting the parabolic arc with said stop device, a handle lever extending from the center to the exterior of the base, between the stops, a clutch upon the handle lever for clamping or releasing the table, a clutch upon the base for clamping or releasing the table, a means for centering a cheese upon the table and a knife for cutting the cheese as shown and described.

4. In a cheese cutter, the combination with a base, a table revoluble upon the base, a knife for cutting the cheese, and a means for centering the cheese upon the table, of a stop device comprising a centrally jointed collapsible scale in two sections, whereof one section is pivotally fixed upon the base, and the other section movable thereon, the pivots of both sections being extended within the base to form stops limiting the movement of the table, proportional space marks on said sections, and a centrally slotted member movable upon said marks for indicating fixed subdivisions of the table revolution, and a means for moving the stop device to increase or diminish the proportional cut indicated with said subdivisions, as shown and described.

5. A cheese cutter comprising a base, a table revoluble upon the base, a hand lever adapted to clamp upon or release the table, a collapsible stop device adjustably limiting the movement of the hand lever, an equally graduated scale concentric with the base spaced in weights and money values, a parabolic arc concentric with the scale and indicating thereon the weight or value of a cheese upon the table, a lever pivoted upon the base and having one end movable by the parabolic arc and the other end pivoted upon the collapsible stop, a means for centering the cheese upon the table, a clamp upon the base for locking the table thereto, and a knife for cutting the cheese upon the table as shown and described.

6. In a cheese cutter of the type described, a scale graduated in equal divisions in two series whereof one indicates weights and the other money values, a collapsible stop for limiting the rotation of the table having subdivisional graduations indicating submultiples of its entire opening, and a parabolic arc adapted to be moved upon the scale to any desired graduation thereon, and thereby close or open the said collapsible stop to a corresponding extent, as shown and described.

7. A cheese cutter, comprising a base, a revoluble table mounted upon the base, a knife supported upon the base and adapted to cut to the center of the table, a hand lever extending from the center to the exterior of the base and adapted to clamp and move the table, a collapsible stop upon the base its stops extending within on either side of said handle, a concentric scale of weights upon the base, a parabolic arc adapted to rotate about the center of the base and indicate upon said scale having radii corresponding to the divisions thereon, and a lever pivoted within the base having one end in contact with the edge of said arc and the other end connected with the movable end of the collapsible stop, whereby the stop is adjusted to correspond with the scale indications, as shown and described.

8. A cheese cutter comprising a base, an equally graduated scale concentric with the base provided with a series of weight graduations and a series of money graduations, a table revoluble upon the base, a series of bell crank levers rotatable upon the base outside of the table to move one arm of each toward the center of the table, a ring rotatable upon the base connected with said levers whereby they are simultaneously operated, a clamp upon the base adapted to impinge upon and lock the table, a hand lever extending to the exterior of the base and provided with a clamp for locking the table to said lever, an adjustable stop upon the base limiting the movement of the hand lever, a parabolic arc within the base having an arm extending across the scale and adapted to indicate thereon, a spring supported lever pivoted within the base and having one end in contact with the arc and the other end connected with the adjustable stop, and a knife mounted upon the base and adapted to cut to the center of the table as shown and described.

9. In a cheese cutter as described, a clamp for retaining the cheese in place upon the table, comprising oppositely placed uprights fitted to embrace the edge of the table, a plate fitting upon said uprights, and thumb nuts to hold said plate in place upon the cheese as shown and described.

10. In a cheese cutter, a base, a revoluble table on the base, a lever for rotating the table upon the base, a collapsible stop device comprising two centrally jointed counterpart halves having projecting stop blocks at its outer ends, whereof one end is pivoted in place on the base and the other is adapted to be moved in an arc slot in the base, and a series of fractional space marks and numerals upon the reading edge of the device, as shown and described.

11. In a cheese cutter as described, a collapsible graduated stop device upon the base, stops at either end limiting the movement of the hand lever, and a slotted indicating plate upon the hand lever through which the graduations may be read at any point of closure of the stop device, as shown and described.

In testimony whereof I have hereunto set my hand in presence of two subscribing witnesses.

JOHN W. CULMER.

Witnesses:
J. C. SWAIM,
JNO. G. PANKEY.